W. W. NEIGHBOUR.
TROLLEY HARP AND WHEEL THEREFOR.
APPLICATION FILED FEB. 25, 1914.
1,187,368.
Patented June 13, 1916.
2 SHEETS—SHEET 2.
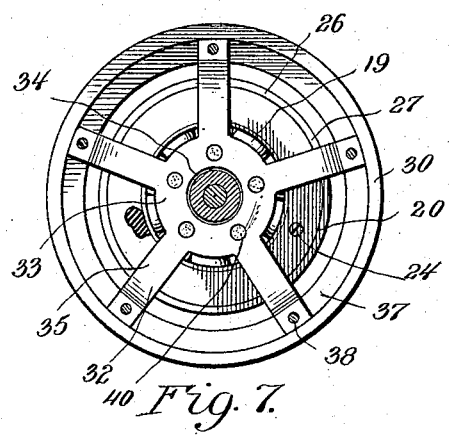
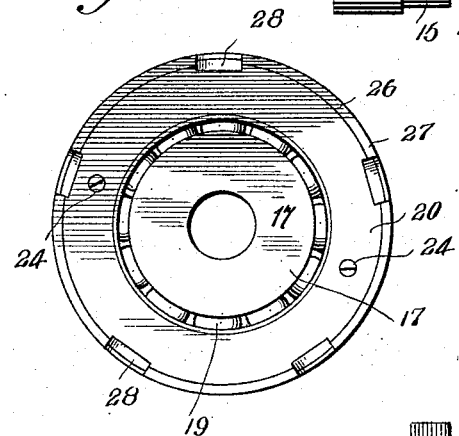
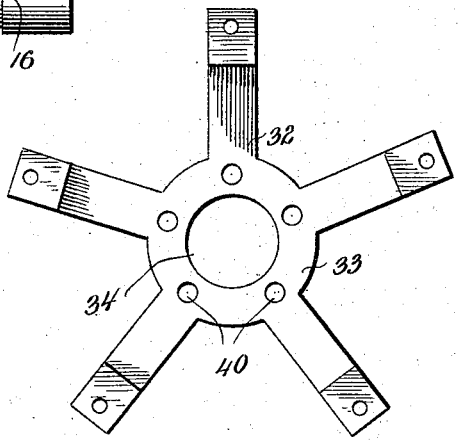
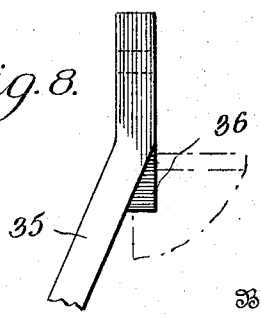
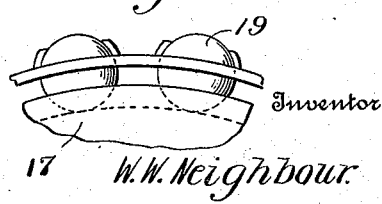
Inventor
W. W. Neighbour.
By Victor J. Evans
Attorney
Witnesses
W. P. Smith

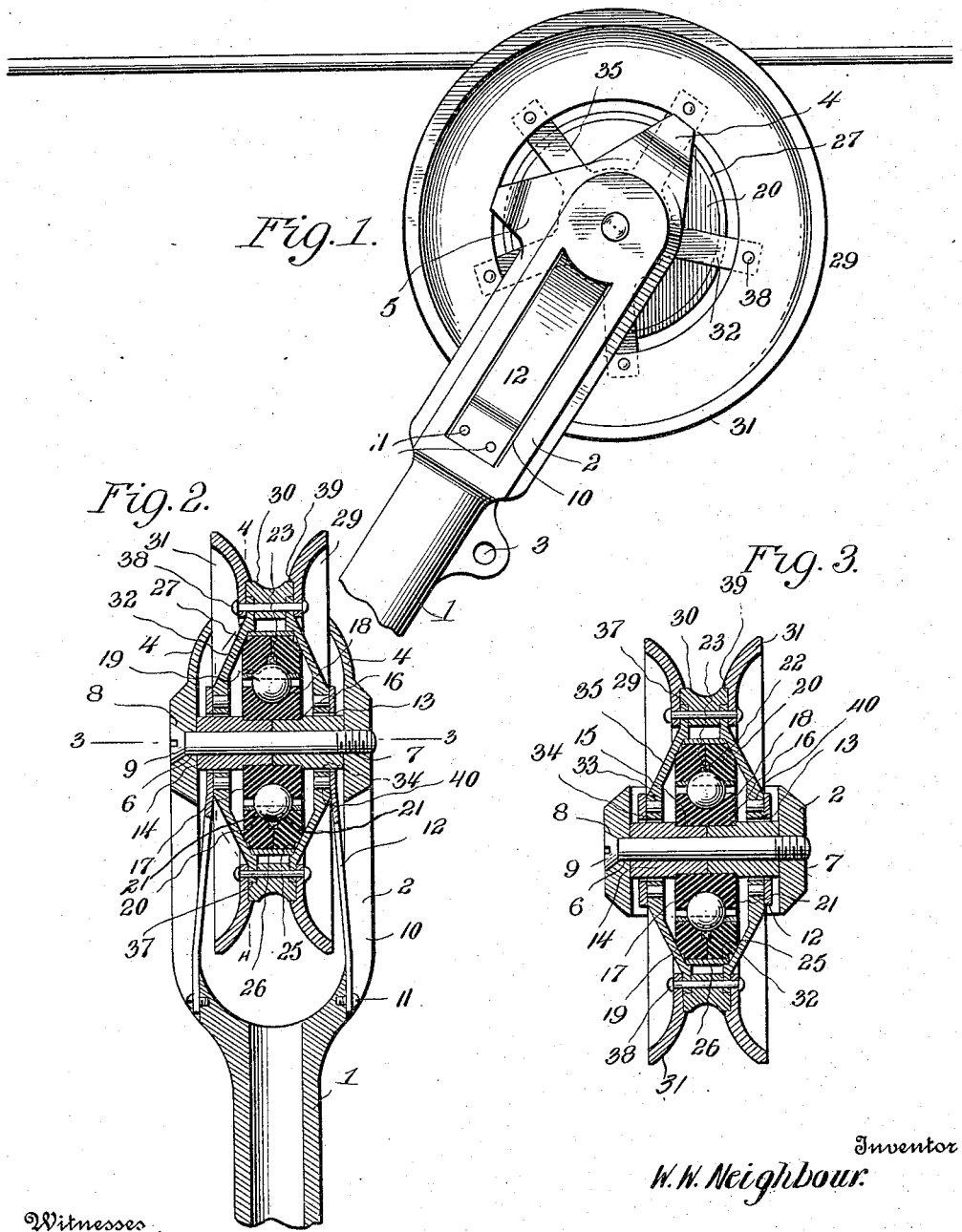

UNITED STATES PATENT OFFICE.

WILLIAM W. NEIGHBOUR, OF SANDUSKY, OHIO.

TROLLEY-HARP AND WHEEL THEREFOR.

1,187,368. Specification of Letters Patent. Patented June 13, 1916.

Application filed February 25, 1914. Serial No. 821,065.

*To all whom it may concern:*

Be it known that I, WILLIAM W. NEIGHBOUR, a citizen of the United States, residing at Sandusky, in the county of Erie and State of Ohio, have invented new and useful Improvements in Trolley-Harps and Wheels Therefor, of which the following is a specification.

The present invention relates to improvements in trolley harps and wheels therefor.

In carrying out my invention I propose to construct a trolley wheel wherein the same will include a number of parts, each being removable and interchangeable, and whereby the wheel will rotate freely without binding or friction.

It is a still further object of my invention to provide the harp for the wheel with guard members which will guide the wire away from engagement between the wheel and the arms of the trolley harp should the feed wire become disengaged from the trolley wheel.

It is also my purpose to provide a trolley harp with a hub of insulated material and a boxing for the hub also constructed of insulating material, the boxing and hub being provided with a raceway for the reception of anti-friction rollers and the raceway being formed with a lubricant chamber whereby the rollers are properly lubricated, the wheel proper being removably connected with the boxing and being rotated therewith upon the hub.

Other objects and advantages of the device will appear as the nature of the improvement is more fully understood, reference being had to the accompanying drawings, in which there is illustrated a satisfactory reduction of my invention to practice.

The essential features of the invention are necessarily susceptible of embodiment in various forms of construction without departing from the scope of the invention, and so the showing in the drawings is to be considered merely illustrative and it is to be understood that I am entitled to all such changes therein as fall within the scope of my claims.

In the said drawings: Figure 1 is a side elevation of a trolley pole and wheel constructed in accordance with the present invention, Fig. 2 is a central transverse sectional view of the same, Fig. 3 is an irregular sectional view taken through two of the spokes of the trolley wheel approximately on the line 3—3 of Fig. 2, Fig. 4 is a sectional view on the line 4—4 of Fig. 2, Fig. 5 is a side elevation of the hub and boxing, Fig. 6 is a view looking toward the inner face of one of the detachable side members of the trolley wheel, Fig. 7 is a view of the spindle, the members comprising the same being separated, Fig. 8 is a detail view of an arm of one of the side members, showing the same provided with a lug to engage in a notch in the boxing, and Fig. 9 is a detail illustrating the spherical bearing members arranged for rotation within a cage.

Referring now to the drawings in detail, the numeral 1 designates the trolley harp which has its lower portion of the usual tubular formation to receive the trolley pole and its upper portion enlarged and bifurcated to provide spaced sides or arms 2. The tubular portion of the harp 1, intermediate the arms 2, is provided with an eye 3 which is adapted to receive the cord or cable whereby the harp is lowered to bring the trolley wheel out of engagement with the feed wire when the direction of travel of the car is to be reversed or when the car is out of service.

The arms of the harp 1 have their upper edges rounded and their sides preferably beveled, as clearly shown in the drawings, and integrally formed with the rounded end of each of the arms is an inwardly rounded flat finger 4, while arranged upon the said arms, to the sides thereof opposite the eye 3, and at a suitable distance from the fingers 4 are similar fingers 5, the purpose of the said fingers 4 and 5 will presently be set forth. The arms of the harp at their upper and rounded ends are provided with alining openings 6, one of the same being threaded, as at 7, the other being countersunk, as at 8, the countersink 8 receiving the head 9 of a bolt which passes through the openings 6 and which engages with the threads 7 in the opposite opening 8. By this arrangement the bolt 9 may adjust the arms of the harp toward or away from each other as desired.

The arms of the harp, at a distance below their openings 6, are provided with longitudinally extending slots or openings 10 which terminate only a slight distance above the tubular portion of the said harp, and arranged within each of said openings 10 and secured to the harp at their lower ends through the medium of removable elements in the nature of screws 11, are flat centering or conducting springs 12, the upper portions of said springs terminating above the openings 6 in the arms of the harp and being provided with annular openings 13 which are in register with the said openings 6, and the purpose of this arrangement will also be presently described.

Arranged upon the shank of the bolt or axle 9 is a spindle 14, the same comprising two members each of a similar construction, each of said members having a reduced barrel 15 providing a shoulder 16 between the spindle proper and the barrel. When the members or sections of the spindle are arranged upon the shaft 9, and the same is adjusted, the ends of the barrel are adapted to be forced into tight frictional engagement with each other, and the inner faces of the arms 2 of the harp abutting with the ends of the spindle serve as means for preventing the rotation of the spindle upon the shaft. If desired, the outer faces of the spindle and the inner faces of the arms which contact with the outer faces of the spindle may be serrated or otherwise formed with interengaging members to assure the non-rotation of the spindle upon the shaft. Arranged upon the barrel 15 of the spindle 14 and adapted to be contacted by the shoulders 16, and to be sustained against rotation, is a hub 17. This hub is constructed of some insulated material, preferably of fiber, and comprises an annular member of a width slightly in excess of the distance between the shoulders 16 of the spindle 14, so that the said hub will be compressed by the shoulders when the shaft or bolt 9 is tightened between the arms of the trolley harp. The outer round periphery of the hub is centrally provided with a continuous groove 18, the lower wall of which is rounded and the depth of the groove is less than one-half of the circle the groove 18 providing a raceway for spherical members or anti-friction balls 19. Adapted to surround the hub 17 is what I term a boxing 20. This boxing is also constructed of insulated material, preferably fiber, and is in the form of an annulus. The boxing comprises two members each of a similar construction, and each of the said members has its inner face formed with an annular depression 21, and when the ends of the said sections of the boxing are brought together the depressions register and provide the second member of the raceway for the anti-friction spherical members 19. The bore of the boxing 20 is of a greater diameter than the diameter of the hub 17, so that the said boxing is spaced, by the spherical anti-friction balls 19, at a suitable distance from the periphery of the hub. The contacting faces of the sections of the boxing are provided at intervals with semi-circular grooves 22 circumferentially arranged about the annular depressions 21 and communicating therewith, said grooves alining when the sections are connected and forming pockets for the reception of loops on a felt ring 23, which serves as a ball spacer, whereby the spherical anti-friction balls 19 will be continually oiled as long as the ring retains the lubricant, and as a considerable space is left between the hub and the boxing, additional lubrication may readily be applied to and absorbed by the ring. The sections of the boxing 20 are connected through the medium of removable elements such as screws 24. In addition to the screws, I have found it desirable to recess the peripheries of the sections of the boxing at the outer edges thereof, to provide the same with shoulders 25 upon their outer faces, and surrounding the periphery of the boxing is a band 26 which has its sides flanged, as at 27, the said flanges engaging with the shoulders 25. Also, at suitable intervals I notch the outer faces of the boxing 20 at the outer edges thereof, the said notches being indicated by the numerals 28, and the purpose of this arrangement will be presently set forth.

The trolley wheel is indicated broadly by the numeral 29 and includes a grooved rim 30 provided with detachable outwardly flared side flange members 31—31 and side or connecting members 32—32. The side members 32 comprise each a central portion or hub 33, each of the same being provided with an annular opening 34 which is of an ample size to permit of the said sides 32 being arranged over and out of contact with the spindle 14, and the said central portion 33 of each of the said sides 32 has radiating therefrom a plurality of inwardly inclined arms or spokes 35, each of said spokes being provided with a lug 36 that is adapted to be received within one of the notches 28 upon the opposite sides of the boxing 20. The opposite sides of the rim 30, at the lower edges thereof, are recessed, as at 37, to receive the ends of the spokes or arms 35, the said ends of the arms being straight or in a plane parallel with that of the central portions 33 of each of said members 32, and the said ends are provided with openings which are adapted to register with similar openings in the rim, and with similar openings in the inner portions of the flanges 31, while passing through the registering openings are securing members in the nature of detachable bolts or rivets 38. The inner faces of the flanges 31 are provided with continuous grooves forming the same with shoulders 39, the said shoulders resting upon the outer periphery of the rim 30 while the reduced portions of said flanges engage with the sides of the rim and contact with the outer faces of the arms 35 of the members 32, and the securing bolts or rivets providing means for forcing the flanges into tight engagement with the sides of the rim. The curved faces of the flanges terminate adjacent the opposite side walls of the central rounded recess or groove in the upper face of the rim, to direct the feed wire within the said groove, and as the flanges project a suitable distance above the rim, danger of the feed wire entirely leaving the wheel, owing to slight irregularities therein or owing to an undulating surface over which the car to which the trolley pole is attached travels, is effectively reduced if not entirely overcome.

The springs 12 have their openings passed over the ends of the spindle 14, so that the upper ends of the said springs contact with the outer faces of the central portions 33 of the members 32, and serve as an additional means for centering the wheel between the arms of the harp. The springs further serve as conducting members for directing the electric current from the side members 32 of the wheel, the said current being received therefrom through the rim or through the flanges of the rim. The central or hub portions 33 of the sides 32 are provided with a plurality of openings 40 which are normally filled with carbon, and it will be noted that the space between the arms or spikes 35 provide ample means for the insertion of the spout of a lubricant can whereby a lubricant may be delivered between the anti-friction balls to the felt washer, and further it will be noted that the parts of the wheel may be removed for repairs, or for other purposes without interfering with the bearings for the wheel. With a device constructed as described, a perfect contact will be maintained between the wheel and the conducting wire without danger of the current coming in contact with the bearings of the wheel or retarding the motion of the said wheel, and from the above description, taken in connection with the accompanying drawings, the advantages of the device will, it is thought, be perfectly apparent to those skilled in the art to which such invention appertains without further detailed description, it being noted that the fingers 4 and 5 being arranged with an inward curvature have the ends thereof received between the outer edges of the flanges and the side members of the wheel, so that should the trolley wheel leave the wire the same cannot enter between the arms and the wheel, and further the beveled or inclined sides of the arms will direct the wire entirely away from the harp.

Having thus described the invention, what I claim is:

1. A trolley wheel comprising spaced hubs having inclined arms extending radially therefrom and having the ends thereof distant from the hubs bent to lie in a plane parallel therewith, a rim disposed between the bent ends of the arms and having a portion thereof extending above the same, said extending portion being provided with an annular groove, and side flanges detachably connected with the bent ends of the arms and rim and extending above the same.

2. A trolley wheel comprising spaced hubs having inclined arms extending radially from said hubs and having the ends thereof distant from the hubs bent to lie in a plane parallel therewith, a grooved rim disposed between the bent ends of the arms and extending above the same, the said rim having circumferentially arranged recesses receiving the bent ends of the arms and side flanges detachably connected with the rim and arms and covering said recesses.

3. A trolley wheel comprising a grooved rim provided upon the opposite sides with spaced recesses, side flanges overlying said recesses and each provided with a curved portion extending above said rim, spaced hubs provided with radially extending arms, said arms having the ends thereof distant from the hubs disposed in the recesses in the rim, and fastening elements passing through the side flanges, the arms and rim.

4. The combination with a trolley harp provided with a fixed bearing having bearing members rotatable thereon and provided with circumferentially disposed recesses in the side walls thereof, of a grooved rim encircling said bearing members in spaced relation thereto and provided with spaced recesses alining with the recesses in the rotatable bearing members, spaced hubs provided with inclined arms contacting with the respective rotatable bearing members and having the ends thereof disposed in the recesses in the rim, a finger depending from each arm on the hubs adjacent its point of contact with the rotatable bearing members, said fingers being disposed in the recesses in the rotatable bearing members.

In testimony whereof I affix my signature in presence of two witnesses.

WILLIAM W. NEIGHBOUR.

Witnesses:
 JAY DANIELS,
 ERNEST W. NEIGHBOUR.

Copies of this patent may be obtained for five cents each, by addressing the "Commissioner of Patents, Washington, D. C."